(12) United States Patent
O'Rourke

(10) Patent No.: US 11,209,254 B2
(45) Date of Patent: Dec. 28, 2021

(54) PELLET SHAPED MARKING ROUND FOR AIR RIFLES AND PISTOLS

(71) Applicant: MSATO, LLC, Wallingford, CT (US)

(72) Inventor: Thomas O'Rourke, Wallingford, CT (US)

(73) Assignee: MSATO, LLC, Wallingford, CT (US)

( * ) Notice: Subject to any disclaimer, the term of this patent is extended or adjusted under 35 U.S.C. 154(b) by 67 days.

(21) Appl. No.: 15/454,723

(22) Filed: Mar. 9, 2017

(65) Prior Publication Data

US 2018/0224252 A1    Aug. 9, 2018

Related U.S. Application Data

(60) Provisional application No. 62/305,720, filed on Mar. 9, 2016.

(51) Int. Cl.
| | |
|---|---|
| *F42B 12/40* | (2006.01) |
| *F42B 6/10* | (2006.01) |
| *F42B 12/76* | (2006.01) |
| *F42B 33/00* | (2006.01) |
| *B29C 45/00* | (2006.01) |

(52) U.S. Cl.
CPC ............. *F42B 12/40* (2013.01); *F42B 6/10* (2013.01); *F42B 12/76* (2013.01); *F42B 33/00* (2013.01); *B29C 45/0001* (2013.01)

(58) Field of Classification Search
CPC .. F42B 12/40; F42B 6/10; F42B 12/76; F42B 33/00
USPC ........................................................ 102/513
See application file for complete search history.

(56) References Cited

U.S. PATENT DOCUMENTS

| | | | | |
|---|---|---|---|---|
| 720,705 | A * | 2/1903 | La Burt ................. | B43K 1/086 401/214 |
| 2,923,957 | A * | 2/1960 | Gentile ................ | A45D 34/041 401/213 |
| 3,147,011 | A * | 9/1964 | Lemelson ............. | F42B 12/362 473/577 |
| 3,649,020 | A * | 3/1972 | Hall ......................... | F42B 6/10 473/569 |
| 3,714,896 | A * | 2/1973 | Young ..................... | F42B 12/34 102/431 |
| 3,732,821 | A * | 5/1973 | Royer ....................... | F42B 8/02 102/431 |

(Continued)

FOREIGN PATENT DOCUMENTS

| | | | |
|---|---|---|---|
| EP | 1854611 | 11/2007 | |
| WO | WO-2005098345 A1 * | 10/2005 | ................ F42B 8/14 |

OTHER PUBLICATIONS

*Ballistic Twist and Length Formulas.* 2017. Retrieved from the Internet: http://kwk.us/twist.html.

(Continued)

*Primary Examiner* — Michelle Clement
(74) *Attorney, Agent, or Firm* — Dunlap Codding, P.C.

(57) ABSTRACT

A new and novel non-lethal pellet shaped marking round for use with air rifles or air pistols, which utilizes the technology and ballistics of a bullet-shaped pellet projectile, and is designed to travel through a rifled barrel or a polygonal rifling barrel. Also disclosed is a novel non-lethal marking round pellet designed with grooves which imitate the spiral caused by a rifled barrel while utilizing a smooth bore barrel.

20 Claims, 8 Drawing Sheets

(56) References Cited

U.S. PATENT DOCUMENTS

| | | | | |
|---|---|---|---|---|
| 3,776,137 A * | 12/1973 | Abbott | F42B 5/02 | 102/431 |
| 3,865,038 A * | 2/1975 | Barr | F42B 12/40 | 102/502 |
| 3,911,824 A * | 10/1975 | Barr | F42B 12/367 | 102/502 |
| 4,128,059 A * | 12/1978 | Black | F42B 12/40 | 102/513 |
| 4,251,079 A * | 2/1981 | Earl | F42B 6/10 | 473/569 |
| 4,281,599 A * | 8/1981 | Weber | F42B 12/44 | 102/364 |
| 4,306,818 A * | 12/1981 | Manusch | B43K 5/005 | 401/18 |
| H114 H * | 8/1986 | Quintavalle | | 102/513 |
| 4,637,616 A * | 1/1987 | Whiting | A63B 43/00 | 473/237 |
| 4,886,275 A * | 12/1989 | Walker | A63B 69/3655 | 473/280 |
| 4,940,350 A * | 7/1990 | Kim | A45D 34/041 | 401/209 |
| 5,009,165 A * | 4/1991 | Morris | F42B 6/10 | 102/501 |
| 5,035,183 A * | 7/1991 | Luxton | F42B 8/16 | 102/447 |
| 5,051,017 A * | 9/1991 | Yorks | A45D 34/041 | 401/209 |
| 5,086,703 A * | 2/1992 | Klein | F42B 12/46 | 102/439 |
| 5,259,319 A * | 11/1993 | Dravecky | F42B 5/073 | 102/439 |
| 5,263,417 A * | 11/1993 | Godfrey-Phillips | F42B 7/08 | 102/453 |
| D348,907 S * | 7/1994 | Prentice | | D21/454 |
| 5,415,104 A * | 5/1995 | Bispling | F42B 8/04 | 102/439 |
| 5,565,649 A * | 10/1996 | Tougeron | F42B 12/36 | 102/370 |
| 5,586,694 A * | 12/1996 | Breidenbach | A45D 34/02 | 222/183 |
| 5,669,836 A * | 9/1997 | Hill | F42B 6/08 | 473/574 |
| 5,676,481 A * | 10/1997 | Nicoll | B43K 5/1845 | 401/148 |
| 5,851,077 A * | 12/1998 | Trejo | A45D 34/041 | 401/6 |
| 5,957,601 A * | 9/1999 | Weiss | B43K 8/003 | 401/18 |
| 6,041,712 A * | 3/2000 | Lyon | F42B 5/02 | 102/439 |
| 6,095,708 A * | 8/2000 | Butaud | A45D 34/041 | 401/209 |
| 6,142,895 A * | 11/2000 | Jason | F42B 12/362 | 473/577 |
| 6,230,630 B1 * | 5/2001 | Gibson | F42B 10/24 | 102/477 |
| 6,283,037 B1 * | 9/2001 | Sclafani | F42B 12/34 | 102/444 |
| 6,371,028 B2 * | 4/2002 | Saxby | F42B 12/34 | 102/444 |
| 6,378,439 B1 * | 4/2002 | Saxby | F42B 12/40 | 102/513 |
| 6,379,069 B1 * | 4/2002 | May | B65D 25/08 | 222/490 |
| 6,393,992 B1 * | 5/2002 | Vasel | F41B 15/02 | 102/367 |
| 6,497,181 B1 * | 12/2002 | Manole | F42B 12/38 | 102/513 |
| 6,526,893 B2 * | 3/2003 | May | F42B 6/10 | 102/508 |
| 6,543,365 B1 * | 4/2003 | Vasel | F41B 11/57 | 102/367 |
| 6,619,211 B1 * | 9/2003 | Haeselich | F42B 8/12 | 102/444 |
| 6,688,792 B1 * | 2/2004 | Reichmann | B43K 27/08 | 401/18 |
| 6,712,539 B2 * | 3/2004 | Richard | A45D 33/12 | 401/209 |
| 6,772,694 B1 * | 8/2004 | Pearce, III | F42B 12/50 | 102/370 |
| 6,931,993 B1 * | 8/2005 | Manole | F42B 12/38 | 102/458 |
| 7,117,818 B2 * | 10/2006 | Pappas | A01K 1/0356 | 119/72.5 |
| 7,194,960 B2 * | 3/2007 | Vasel | F41B 11/62 | 102/367 |
| 7,195,415 B1 * | 3/2007 | Vial | B43K 5/005 | 401/109 |
| 7,475,638 B2 * | 1/2009 | Haeselich | F42B 8/12 | 102/444 |
| 7,503,260 B2 * | 3/2009 | Kapeles | F42B 5/02 | 102/439 |
| 7,526,998 B2 * | 5/2009 | Vasel | F42B 7/08 | 102/370 |
| 7,581,899 B2 * | 9/2009 | May | A45D 34/04 | 401/132 |
| 7,604,556 B2 * | 10/2009 | Witzigreuter | F42B 12/40 | 102/513 |
| 7,819,065 B2 * | 10/2010 | Haeselich | F42B 8/02 | 102/439 |
| 7,883,774 B1 * | 2/2011 | Baggs | C09B 67/0083 | 428/402.2 |
| 7,958,828 B1 * | 6/2011 | Kapeles | F42B 8/00 | 102/502 |
| 7,975,590 B2 * | 7/2011 | Salva | F42B 33/001 | 86/54 |
| 8,020,492 B1 * | 9/2011 | Kapeles | F42B 10/02 | 102/502 |
| 8,065,962 B2 * | 11/2011 | Haeselich | F42B 12/40 | 102/498 |
| 8,261,665 B1 * | 9/2012 | Walsh | F42B 8/26 | 102/498 |
| 8,286,557 B2 * | 10/2012 | Endicott | F42B 12/40 | 102/444 |
| 8,485,102 B2 * | 7/2013 | Carlson | F42B 12/40 | 102/513 |
| 8,529,384 B2 * | 9/2013 | Corlett | F42B 12/367 | 473/581 |
| 8,539,885 B2 * | 9/2013 | Huffman | F42B 12/40 | 102/439 |
| 8,596,220 B2 * | 12/2013 | Mainini | A01K 7/00 | 119/72 |
| 8,640,621 B2 * | 2/2014 | Broden | F42B 8/14 | 102/444 |
| 8,813,652 B2 * | 8/2014 | Shin | F42B 12/40 | 102/513 |
| 8,875,634 B2 * | 11/2014 | Gibson | F42B 12/40 | 102/502 |
| 8,899,863 B2 * | 12/2014 | Geiger | A45D 40/261 | 401/209 |
| 8,910,830 B2 * | 12/2014 | May | B05C 17/00553 | 222/94 |
| 8,915,191 B2 * | 12/2014 | Jones | F42B 8/14 | 102/502 |
| 8,979,680 B2 * | 3/2015 | Hudack, III | A63B 67/00 | 473/415 |
| 9,140,528 B1 * | 9/2015 | Thomas | F42B 12/50 | |
| 9,157,711 B2 * | 10/2015 | Tresserras Torre | F42B 12/78 | |
| 9,157,715 B1 * | 10/2015 | Lafortune | F42B 12/40 | |
| 9,423,222 B1 * | 8/2016 | Thomas | F42B 12/02 | |
| 9,470,489 B1 * | 10/2016 | Bowden | F42B 6/10 | |
| 9,746,297 B2 * | 8/2017 | Buys | F42B 12/40 | |
| 9,835,426 B2 * | 12/2017 | Carlson | F42B 8/16 | |
| 9,958,242 B2 * | 5/2018 | Sullivan | F42B 12/40 | |
| 9,993,059 B2 * | 6/2018 | Langdon | A45D 34/041 | |
| 10,040,312 B2 * | 8/2018 | Orem | B43K 8/03 | |
| D859,527 S * | 9/2019 | McBride, Jr. | D19/200 | |
| 10,518,930 B2 * | 12/2019 | May | B05C 1/04 | |

(56) References Cited

U.S. PATENT DOCUMENTS

| | | | |
|---|---|---|---|
| 2001/0042486 A1* | 11/2001 | Dales | F42B 7/046 102/449 |
| 2001/0054367 A1* | 12/2001 | Pearce, III | F42B 12/50 102/502 |
| 2002/0100389 A1* | 8/2002 | May | F42B 6/10 102/501 |
| 2002/0178507 A1* | 12/2002 | Goldoni | A47L 25/08 8/115.51 |
| 2004/0005186 A1* | 1/2004 | Ueda | A47L 25/08 401/194 |
| 2004/0069177 A1* | 4/2004 | Klein | F42B 12/36 102/502 |
| 2005/0016412 A1* | 1/2005 | Vasel | F42B 7/08 102/502 |
| 2005/0081734 A1* | 4/2005 | Sharplin | F42B 7/08 102/482 |
| 2005/0229807 A1* | 10/2005 | Brock | F42B 8/14 102/502 |
| 2005/0249540 A1* | 11/2005 | Gueret | A45D 34/041 401/211 |
| 2005/0284325 A1* | 12/2005 | Saxby | F42B 12/40 102/502 |
| 2006/0011090 A1* | 1/2006 | Vasel | F41B 11/62 102/512 |
| 2006/0032393 A1* | 2/2006 | Haeselich | F42B 8/02 102/502 |
| 2006/0254453 A1* | 11/2006 | Leal | F42B 12/40 102/513 |
| 2006/0276277 A1* | 12/2006 | Montefusco | F42B 8/16 473/586 |
| 2006/0288898 A1* | 12/2006 | Byun | F42B 6/10 102/502 |
| 2007/0074637 A1* | 4/2007 | Pontieri | F42B 6/10 102/501 |
| 2007/0119329 A1* | 5/2007 | Haeselich | F42B 8/12 102/498 |
| 2008/0000464 A1* | 1/2008 | Campo | F42B 12/40 124/71 |
| 2008/0003052 A1* | 1/2008 | Lee | A45D 34/041 401/209 |
| 2008/0039248 A1* | 2/2008 | Witzigreuter | F42B 12/40 473/577 |
| 2008/0053330 A1* | 3/2008 | Haeselich | F42B 8/14 102/513 |
| 2008/0178758 A1* | 7/2008 | Kapeles | F42B 12/34 102/502 |
| 2008/0229964 A1* | 9/2008 | Cranor | F42B 12/40 102/513 |
| 2009/0071459 A1* | 3/2009 | Wenaas | F41B 11/62 124/71 |
| 2009/0101038 A1* | 4/2009 | Kapeles | F42B 12/40 102/502 |
| 2009/0157153 A1* | 6/2009 | Lemke | A61F 7/10 607/114 |
| 2009/0196675 A1* | 8/2009 | May | B65D 35/28 401/206 |
| 2009/0266262 A1* | 10/2009 | Vasel | F42B 7/08 102/370 |
| 2010/0207330 A1* | 8/2010 | Yaroch | A63F 9/0204 273/358 |
| 2010/0218695 A1* | 9/2010 | Kirkpatrick | F42B 12/40 102/513 |
| 2010/0282118 A1* | 11/2010 | Ladyjensky | F42B 12/40 102/513 |
| 2011/0023744 A1* | 2/2011 | Endicott, Jr. | F42B 12/40 102/502 |
| 2011/0146524 A1* | 6/2011 | Pang | C08B 31/185 102/513 |
| 2011/0252999 A1* | 10/2011 | Carlson | F42B 12/40 102/513 |
| 2011/0308419 A1* | 12/2011 | Haremza | F42B 6/10 102/511 |
| 2012/0020050 A1* | 1/2012 | Longo | F42B 12/40 362/34 |
| 2012/0067242 A1* | 3/2012 | Shin | F42B 12/40 102/364 |
| 2012/0097062 A1* | 4/2012 | Scanlon | F42B 8/14 102/513 |
| 2012/0192755 A1* | 8/2012 | Huffman | F42B 12/40 102/513 |
| 2012/0199034 A1* | 8/2012 | Gibson | F42B 10/06 102/502 |
| 2012/0255458 A1* | 10/2012 | Sullivan | F42B 12/40 102/513 |
| 2013/0133581 A1* | 5/2013 | Anderson | A01K 5/00 119/51.01 |
| 2013/0217025 A1* | 8/2013 | Gibson | B01L 3/52 435/6.12 |
| 2013/0337949 A1* | 12/2013 | Macy | F41A 9/65 473/577 |
| 2014/0026778 A1* | 1/2014 | Saxby | F42B 12/40 102/502 |
| 2014/0030004 A1* | 1/2014 | Nakamura | B05C 11/00 401/176 |
| 2014/0041545 A1* | 2/2014 | Aw | F42B 12/40 102/513 |
| 2014/0305328 A1* | 10/2014 | Dierks | F42B 12/40 102/363 |
| 2014/0318402 A1* | 10/2014 | Carlson | F42B 12/40 102/439 |
| 2014/0373745 A1* | 12/2014 | Carlson | F42B 8/16 102/502 |
| 2015/0020705 A1* | 1/2015 | Hartmann | F42B 12/50 102/369 |
| 2015/0027335 A1* | 1/2015 | Barthelemy | F42B 8/00 102/513 |
| 2015/0050066 A1* | 2/2015 | Schaffnit | B43K 8/003 401/198 |
| 2015/0125199 A1* | 5/2015 | Peyton | B43K 7/12 401/213 |
| 2015/0144018 A1* | 5/2015 | Buys | F42B 12/40 102/502 |
| 2015/0165813 A1* | 6/2015 | Martin | B43K 23/004 29/428 |
| 2015/0338197 A1 | 11/2015 | Bowden | |
| 2016/0320167 A1* | 11/2016 | Sullivan | F42B 12/40 |
| 2017/0045346 A1* | 2/2017 | Aw | F42B 12/36 |
| 2017/0136804 A1* | 5/2017 | Orem | B43K 19/003 |
| 2018/0156587 A1* | 6/2018 | Raquin | F42B 12/40 |
| 2018/0202785 A1* | 7/2018 | Omonira | F42B 12/54 |
| 2018/0209773 A1* | 7/2018 | Lopez-Pozas Lanuza | C08K 3/013 |
| 2018/0224252 A1* | 8/2018 | O'Rourke | F42B 12/40 |
| 2018/0228269 A1* | 8/2018 | Tapocik | A45D 34/041 |
| 2018/0339542 A1* | 11/2018 | Orem | B43K 27/00 |
| 2019/0025032 A1* | 1/2019 | Cooper | F42B 12/40 |
| 2019/0072370 A1* | 3/2019 | Moreno | F42B 12/50 |

OTHER PUBLICATIONS

*Gyroscopic Stability (SG) and Twist Rate.* 2017. Retrieved from the Internet: http://bulletin.accurateshooter.com/2017/02/figuring-optimal-rpm-with-berger-twist-rate-stability-calculator/.

Wood, Keith. *How to Pair Barrel Twist Rates with Bullets.* Nov. 17, 2016. Retrieved from the Internet: http://www.gunsandammo.com/ammo/pair-barrel-twist-rates-ammo/#ixzz4aegcRsUR.

International Search Report and Written Opinion regarding PCT App. No. PCT/US17/21634 dated Jun. 2, 2017, 9 pages.

* cited by examiner

PELLET SHAPED MARKING ROUND FOR AIR RIFLES AND PISTOLS

INCORPORATION BY REFERENCE

This application claims priority to U.S. Provisional Application No. 62/305,720 filed Mar. 9, 2016, the entire contents of all of which is hereby expressly incorporated herein by reference.

FIELD OF THE INVENTION

The present disclosure generally relates to ammunition for air rifles, pistols, and similar devices thereof which are to be used in non-lethal and Force on Force training, competition, and target shooting. In particular, the present invention relates to a non-metal pellet shaped marking round for air rifles and air pistols, including, but not limited to airsoft electric guns (AEGs), gas blow-back pistols and rifles (GBBs) and High Pressure Air guns (HPAs).

BACKGROUND OF THE DISCLOSURE

As background, currently air rifles and air pistols use air pressure to shoot projectiles. Generally, those projectiles can be placed in three different categories. The first category includes BBs which are used with BB guns and BB rifles, which have with smooth bore barrels. BBs are made from steel, which is plated in copper or zinc so that there is no corrosion. BBs measure at 4.34 mm to 4.39 mm in diameter. There are some plastic BBs on the market that were created by some manufacturers for recreational purposes. The second category of projectiles includes BB pellets, which are used with BB rifles, which have smooth bore or rifled barrels. Generally, these pellets are made of lead, and are shaped similar to a badminton birdie with a weighted head and flared tails. The weighted head allows the pellet to have directional stability, while the flared tail causes aerodynamic drag, which keeps the head pointed straightforward to the line of flight, while also serving to slow down the projectile to make it non-lethal. Metal BB pellets can travel 1,100 feet per second, are designed to penetrate, and can be lethal. The third category of projectiles for use in air rifles and air pistols are plastic round pellets, which are generally 6 mm to 8 mm in diameter and are various weights, although 0.2 or 0.25 gram weighted plastic is used. These plastic round pellets have good range and accuracy, especially within the 0.2 to 0.25 gram weight range and are non-lethal.

There have been attempts to create marking rounds for use with these air guns, but those prior attempts all utilize the round ball style projectiles. Generally, marking rounds are bullets, similar to BB pellets, which generally contain a luminescent liquid (or powder), and break up upon impact releasing the liquid or powder. The marking rounds are useful in ballistic training because they allow the shooter to see exactly where they hit the target. The shooter can utilize the target information to improve aim.

The prior art teaches marking rounds that could be shot from air rifles and air pistols, but such marking rounds had consistently failed to survive being shot through the air rifles and air pistols, and so the current solution is inadequate. Generally, the marking round is heavily damaged and unable to fulfill its purpose of marking, which is to enable the shooter to use that information to obtain better aim. This is due to the make-up of the marking round, and the effect on the flight of the marking round. This inadequacy of the current marking rounds, for example, makes it extremely difficult for military and law enforcement trainees to see where they hit their opponent or target when using with conventional 6 mm plastic BB rounds.

The biggest hurdle that trainees face is that these marking rounds utilize round ball shaped ammunition which travel down a smooth bore when shot. Currently, the plastic BB round backspins in a standard tightbore barrel due to Magnus effect, which increases the range of flight for the BB, but that backspin energy decreases substantially during flight; thus causing deviations to the trajectory. Alternatively, the plastic BB round is used with an air cushion channel barrel, which has improved accuracy and backspin energy, but still has its faults. Generally, the smooth bore of the rifle sends the marking round on a non-spiraling and unstable course. This is not a realistic model, and creates unreliable ballistics, which makes perfecting accuracy for trainees nearly impossible. Due to this, the air rifle and air pistol trainees do not receive ideal training, and there is a need for a more realistic training model. Thus, there is a need for a marking round that can be successfully shot from an air rifle and air pistol while remaining uncompromised until impact, and while also maintaining an adequate flight range and consistent trajectory. Specifically, there is an additional need for a marking round that can be successfully shot from an air rifle or air pistol which remains uncompromised and can adequately and reliably mark at distances greater than 70 feet. This is especially important when the air rifle and air pistol are being used in training.

The pellets disclosed in the prior art generally contain lead or other metals which are not environmental friendly. The lead and other metals are frequently ingested by animals and end up in waterways and water sources. Thus, there is a need for marking rounds which contain no lead or other contaminating metals.

The present invention solves the prior shortcomings of the current marking rounds on the market. Specifically, the present invention discloses a new and novel non-lethal pellet shaped marking round for use with air rifles or air pistols. The present invention uses the technology and ballistics of a bullet-shaped pellet projectile. As an additional improvement over the prior art, the novel marking round pellet is designed to travel through a rifled barrel, micro-rifled barrel or a polygonal rifling barrel as opposed to current smooth bore air gun barrels. Alternatively, the novel marking round pellet is designed with grooves which imitate the spiral caused by a rifled barrel even though the pellet is being fired out of a smooth bore barrel. The pellet disclosed in present invention is also heavier than a standard marking round, being generally between 0.20 grams and 0.88 grams, however, this may vary. The heavier marking round allows for better breaking upon impact, and better ballistics training. The novel marking round pellet of the present invention is also made out of non-metal material which protects the environment by preventing ground contamination.

In general, the novel non-lethal marking round pellet of the present invention utilizes a marking tip, which may contain chalk, gelatin based shell coating or sponge rubber type tip, and various other marking style tips, including, but not limited to wax with ink tips for either target shooting or force on force shooting. Alternatively, the marking tip may be a solid material for target shooting. The marking round has the capability for use with a magnetic or similar style tip for RFID (Radio Frequency Identification). Thus, the pellet round of the present invention can be used by traditional air rifles and air pistol styles, allowing for force on force human marking, or the present invention can also be used for traditional target shooting, allowing the shooter to see the markings from long distance. The present invention also provides longer range and more accurate air rifle marking pellet that is currently not available in a simple and efficient manner.

SUMMARY OF THE DISCLOSURE

In one aspect, a marking round pellet for use in an air rifle or air pistol is disclosed comprising a casing, wherein the casing comprises at least a head portion, a tail portion, and an intermediary portion, and a marking tip.

In another aspect, a method of manufacturing a marking round pellet is disclosed comprising obtaining an injection mold, wherein the injection mold is configured so as to form a pellet which includes least a head portion, a tail portion, and an intermediary portion, injecting the mold with a non-metal material, and immovably attaching a marking tip at a distal end of the head portion.

DETAILED DESCRIPTION

All illustrations of the drawings are for the purpose of describing selected versions of the present invention and are not intended to limit the scope of the present invention. The invention is not limited in its application to the details of the components and arrangements as described or illustrated. The invention is capable of other embodiments and of being utilized and carried out in various ways.

As used herein, the terms first, second, third, and the like are used to distinguish between similar elements and not necessarily for describing a specific sequential or chronological order. The terms are interchangeable under appropriate circumstances and the embodiments of the invention can operate in other sequences than described or illustrated herein.

In addition, the terms top, bottom, front, rear, left, right, upper, lower, and the like as used herein are used for descriptive purposes and not necessarily for describing specific positions. The terms so used are interchangeable under appropriate circumstances and the embodiments described herein can operate in orientations other than described or illustrated herein.

Furthermore, the phrasing and terminology employed are for the purpose of description and should not be regarded as limiting. As such, the present invention is primarily used in conjunction with air rifles and air pistols; however, the invention may be used in conjunction with other firearms and recreational or toy shooting devices.

Figure 1:
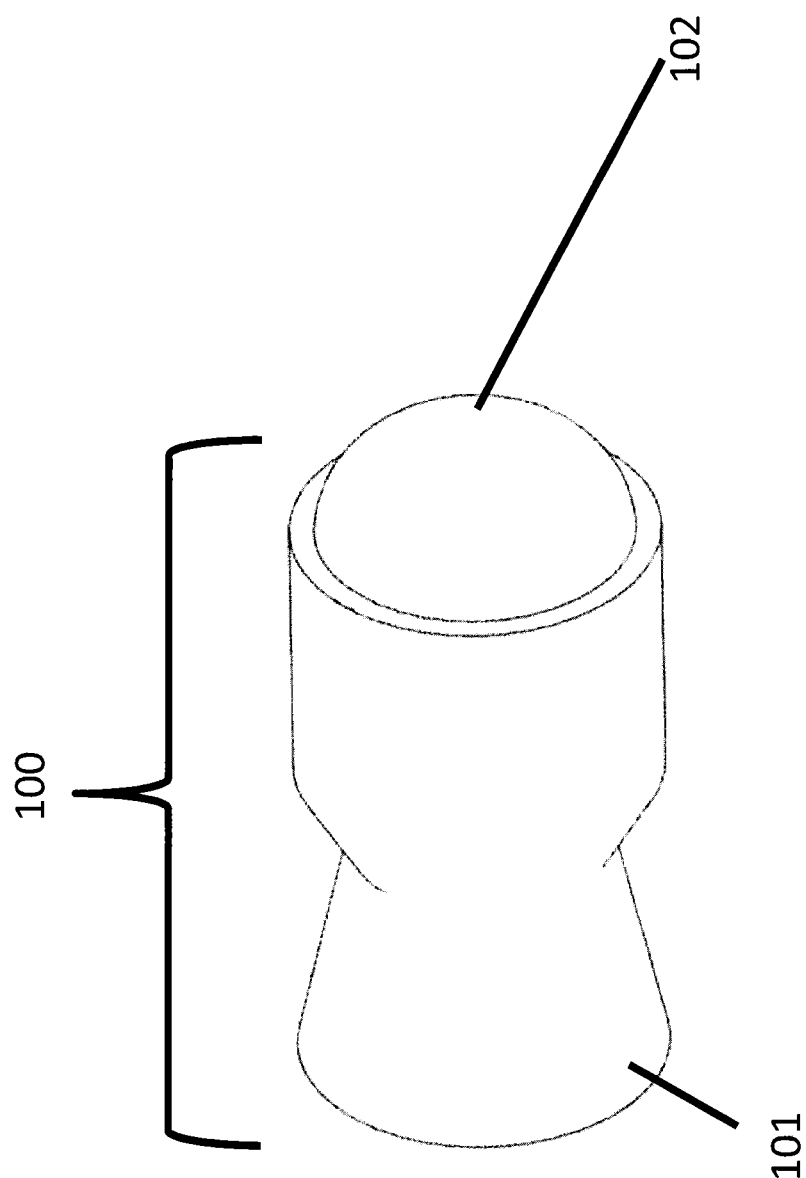
FIG. 1 is an elevated front perspective view of an embodiment of the present invention.

Turning to the Figures, in one embodiment depicted in FIG. 1, the present invention is a non-lethal marking round pellet 100. The non-lethal marking round pellet 100 comprises a casing 101 and a marking tip 102. In a preferred embodiment, the casing 101 and the marking tip 102 are made of non-metal materials, and more preferably the casing 101 and the marking tip 102 are made either wholly or partially from biodegradable or degradable materials. Exemplary non-metal materials include plastic material, organic material, synthetic material or preferably a material that will decompose or break down when used in an outdoor environment. Because the non-lethal marking round pellet 100 is not made of metal, it will allow for Force on Force training and competition, as well as target shooting, particularly if a plastic marking tip 102 is utilized. Generally, the casing 101 and the marking tip 102 are most readily created by injection molding using the selected non-metal material. The marking tip 102 may be immovably attached to the casing 101 by inserting the marking tip 102 into the mold before the casing 101 has fully cured. Alternatively (or even additionally), the marking tip 102 may be immovably attached to the casing 101 with an adhesive.

Figure 2:
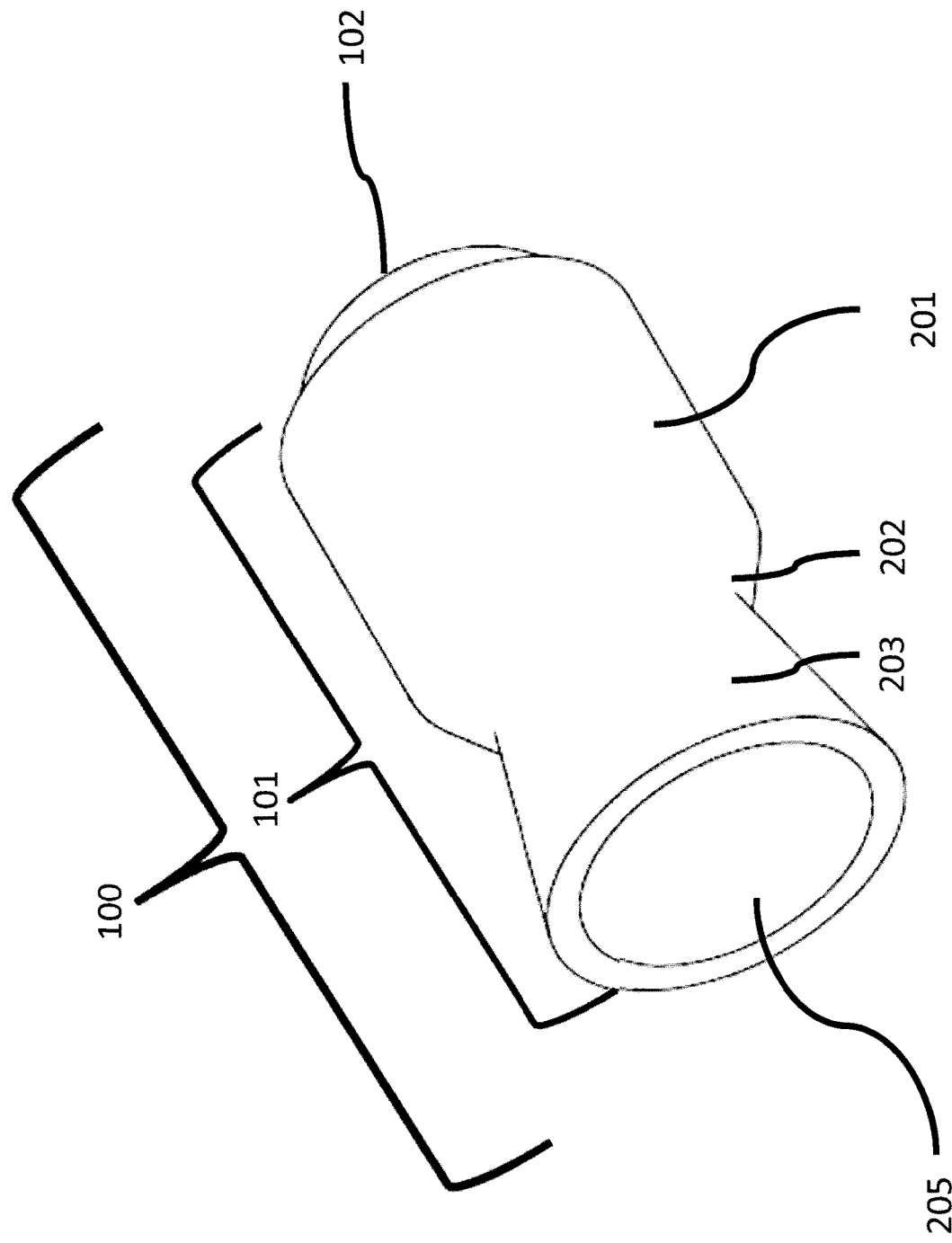
FIG. 2 is a rear-perspective view of the embodiment of the invention shown in FIG. 1.

As is illustrated in FIG. 2, the casing 101 comprises a head portion 201, a tail portion 203, and an intermediary portion 202. The head portion 201, tail portion 203, and intermediary portion 202 join into a single piece of material which forms the casing 101. The head portion 201 is located adjacent the intermediary portion 202 and the intermediary portion 202 is located adjacent to the tail portion 203. The head portion 201 is located opposite the tail portion 203, and at least partially encompasses the marking tip 102.

Figure 3:
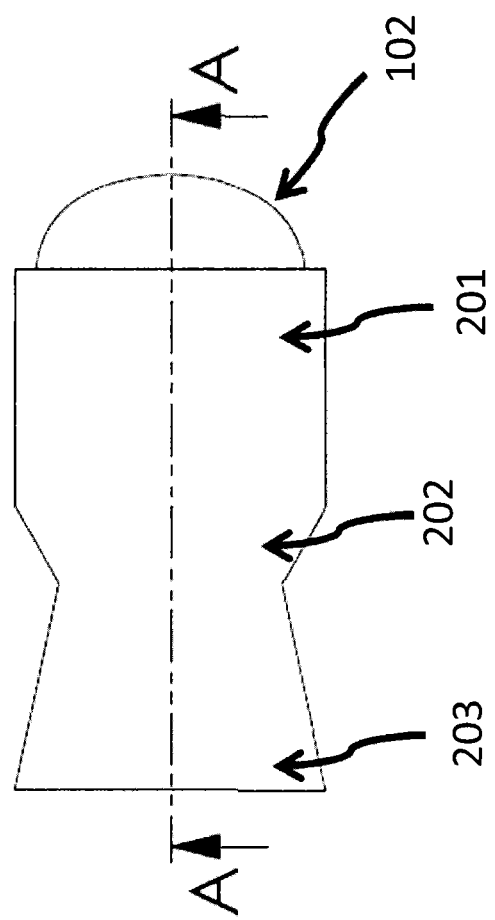
FIG. 3 is an elevated side view of the embodiment of the invention shown in FIG. 1, with a broken line representing section, "A-A"
Figure 4:
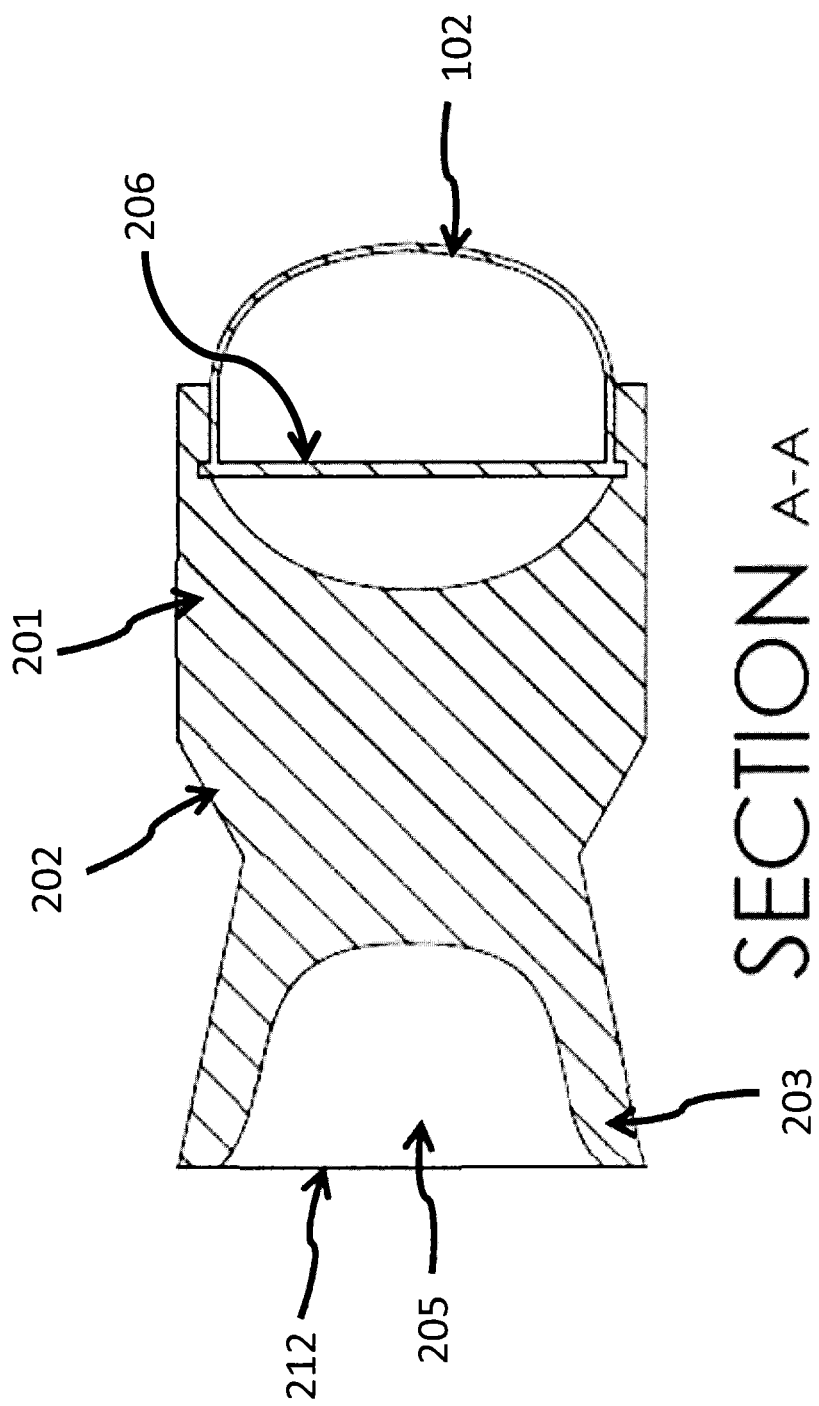
FIG. 4 is a section view of the embodiment of the invention as described in its preferred embodiment, about section, "A-A;"
Figure 5:
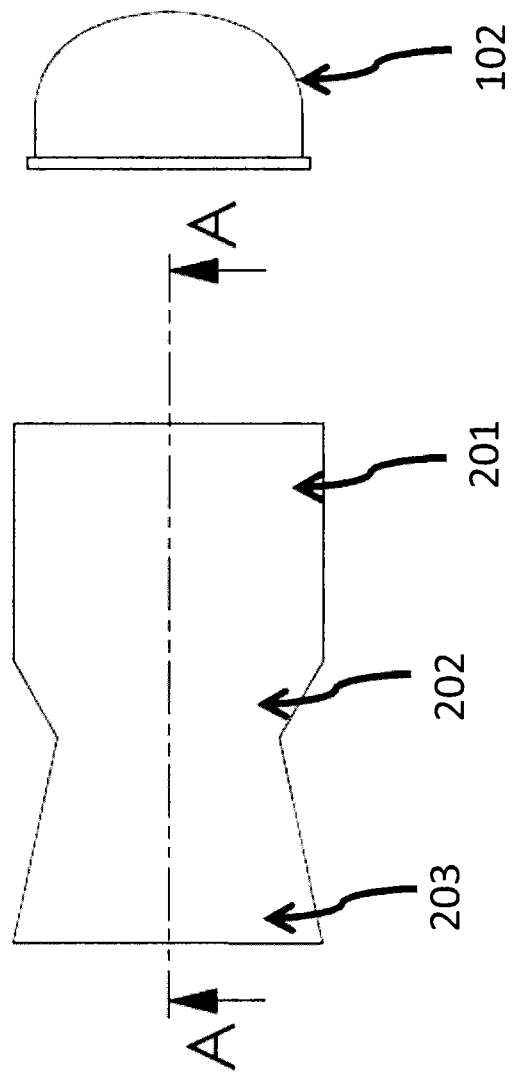
FIG. 5 is an exploded view of that shown in FIG. 3.

As is shown in FIG. 2 and the cross sections illustrated in FIGS. 3 and 4, in a preferred embodiment of the present invention, the tail portion 203 has a circular cross section with varying diameters throughout its length. The tail portion 203 tapers inward toward the intermediary portion 202, with its widest diameter being located at the tail portion distal end 212 which points away from the head portion 201. In the depicted embodiment, the tail portion 203 circumscribes a tail cavity 205. The tail cavity 205 begins at the tail portion's distal end 212 and traverses axially a short distance toward the intermediary portion 202. Among other potential benefits that it may provide, the tail cavity 205 reduces the rear weight of the non-lethal marking round 100 increasing its stability in flight.

As also shown in FIG. 2 and the cross section in FIGS. 3 and 4, in a preferred embodiment of the present invention, the intermediary portion 202 sits in between the head portion 201 and tail portion 203. The intermediary portion 202 has a circular cross section with varying diameters throughout its length. The intermediary portion 202 is tapered along its length, with its narrowest portion nearest the tail portion 203 and its widest portion nearest the head portion 201.

Figure 6:
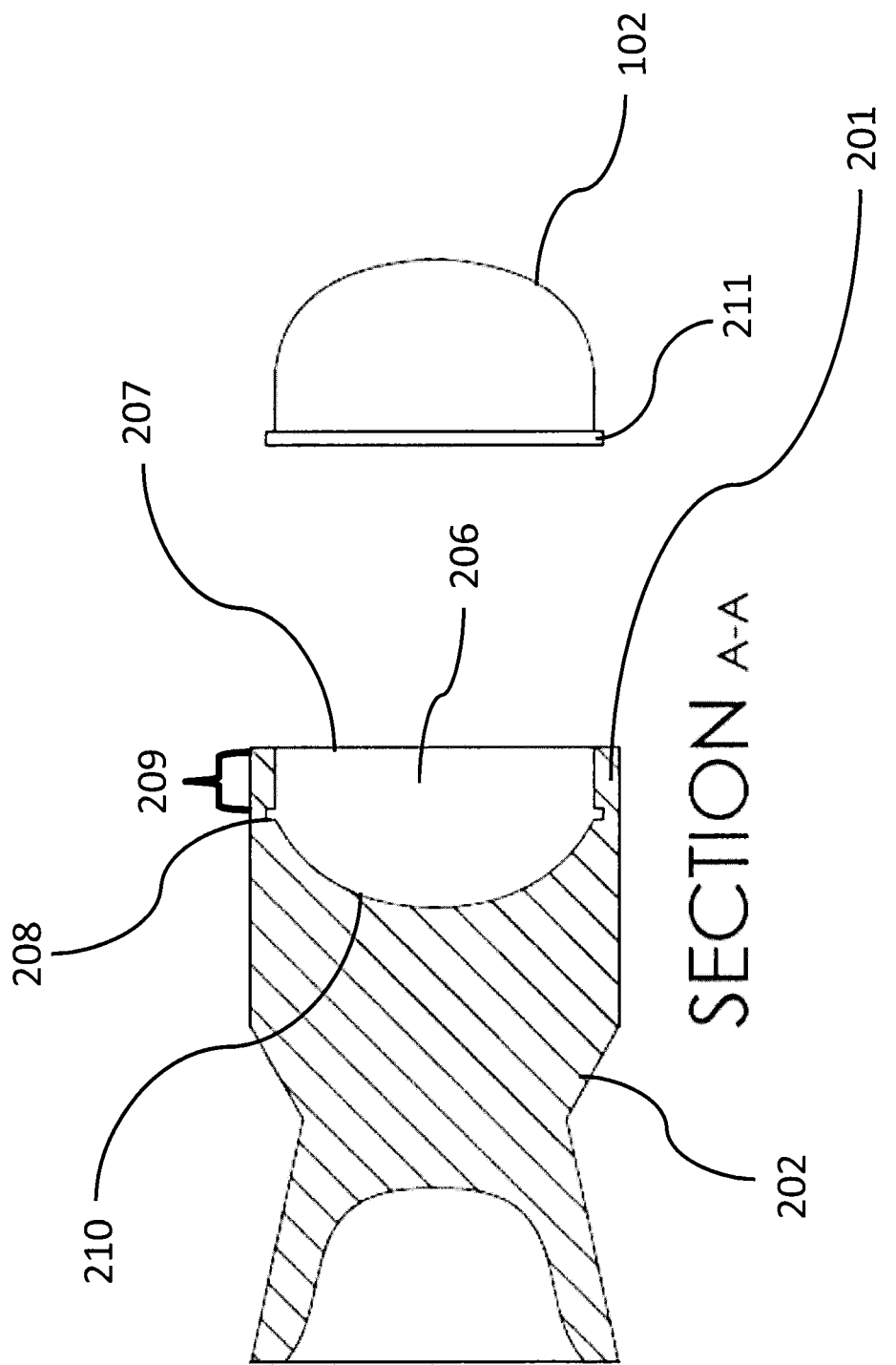
FIG. 6 is an exploded section view of that shown in FIG. 5, about section, "A-A;"

As also shown in FIG. 2 and the cross sections reflected in FIGS. 3 and 4 and FIGS. 5 and 6, in a preferred embodiment of the present invention, the head portion 201 has a circular cross section with a uniform diameter throughout its length. The head portion 201 comprises a head cavity 206. As best illustrated in FIG. 6, the head cavity 206 begins at the head portion's distal end 207 and traverses axially a short distance towards the intermediary portion 202. The head cavity 206 preferably comprises a front section 209, a rear section 210, and a groove 208. The front section 209 has a circular cross section that is shaped and dimensioned to receive a portion of the marking tip 102. The groove 208 is annular and located in between the cavity's front section 209 and rear section 210. The groove 208 has a wider diameter than the front section 209 and rear section 210. The rear section 210 is located opposite the front portion 209, shaped with a concave base. The rear section 210 is hollow (concave), to—among other potential advantages—reduce energy transfer between the non-lethal marking round 101 and its target through the absorption of force on impact. The head portion 201 is weighted in comparison to the tail portion 203 which allows for directional stability of the non-lethal marking round pellet 100 in flight.

In the preferred embodiment of the present invention, the marking tip 102 is a hard brittle shell which may either house a marking material or is the marking material itself. Alternatively, the marking tip 102 is a non-metal, hard material solid tip, preferably made of the same material as the casing 101. In that embodiment the non-lethal marking round pellet 100 is used for target practice only, and no mark is created. If the marking tip 102 does contain a marking material, it is preferred that the marking material is chalk, paint, or a gelatin-based material; however, other acceptable alternatives are envisioned. The marking material may include colored marking material that is ultraviolet, infrared, forward looking infrared (FLIR), and/or luminous (glow-in-the-dark). Additionally or alternatively, the marking tip 102 can contain a RFID marker for use in conjunction with an Electronic Hit Detection system.

Generally, the preferred marking tip 102 is made of chalk, which is preferably in powdered form and contained with a capsule; however, the chalk may also be a chalk and binding substance composition, or a solid chalk. The chalk tip is preferred over a liquid because it is solid and provides better stability in flight unlike, for example, a liquid paint which may be impacted by the forces of shooting and projection which would in turn impact the accuracy and flight of a marking round pellet 100. The chalk selected for us in the marking tip 102 may be modified in various ways. For example, there are various options for the solidness of the chalk depending on the amount of pressure required to leave a mark on the object to be impacted with the marking round pellet 100. Chalk also has varying softness and brittleness which may be selected based on the object to be impacted with the marking round pellet 100. When the marking tip 102 is a chalk and a binding substance (e.g. wax), the marking tip 102 stays solid during flight, but it is soft enough to mark the object to be impacted with the marking round pellet 100.

As shown in FIG. 6, the marking tip 102 may further comprise an annular rim 211. The annular rim 211 protrudes orthogonally from an end of the marking tip 102. The annular rim 211 is shaped and dimensioned to engage with the head cavity groove 208, preventing the marking tip 102 from dislodging from within the front section 209 of the head cavity 206. In a preferred embodiment, when the marking material is not impacted by heat, injection molding is used to affix the marking tip 102 to the head cavity groove 208 through the annular rim 211. Specifically, the marking material, such as chalk is added to the head cavity 206 and injection molding is added to secure the chalk to the head cavity 206 through the annular rim 211. In an alternative embodiment, for example, when the function of the marking material is negatively impacted by heat (as may be the case with some paint formulations, for instance) the marking tip 102 may be created separately and inserted into the head cavity 206 with an adhesive. Any adhesive which will hold the marking tip 102 in the head cavity 206 under the forces imparted on the non-lethal marking round pellet 100 by the air rifle or air pistol during firing and projection is acceptable.

After the non-lethal marking round 100 is shot from an air rifle, air pistol or similar device, the marking tip 102 containing the marking material will fracture upon impact with its target, to which the marking material will mark the point of impact and portions of its immediately adjacent surroundings. It is preferred that the marking tip 102 is 5.90 mm to 9 mm in diameter. In general, the larger the diameter of the marking tip 102, the greater reduction in penetrating unprotected or under protected skin.

In the non-lethal marking round embodiments reflected in FIGS. 1-6, the non-lethal marking round 100 will generally be shot out of an air rifle, air pistol or similar device with a rifled barrel or polygonal rifling barrel, instead of a barrel with a smooth bore. The purpose of utilizing a rifled barrel or polygonal rifling barrel is to impart stability which is based on the principle of gyroscopic stability. As background, projectiles do not maintain a straight flight path unless they are spinning and pushing through the air flow, which rely on two types of bullet stability, gyroscopic stability and dynamic stability. Gyroscopic stability is a predicted stability value "SG" which equals the (rigidity of the spinning mass)/(overturning aerodynamic torque). Generally, it is best to have a GS of greater than 1.4, but a GS of as low as 1.0 is generally considered to be gyroscopically stable. Dynamic stability ("SD") is dependent on the design of the projectile and other coefficients, but the SD should equal as close to 1.0 as possible to maintain substantial stability. In general, the interior of a rifled barrel contains sharp edges and helical grooves (i.e. rifling) which dig into a projectile to impart a spin to the projectile which improves the projectile's aerodynamic stability and accuracy. Alternatively, the interior of a polygonal rifling barrel substitutes the sharp edges and helical grooves found in a rifled barrel with hills and valleys which allow for spiraling, but do not dig into the projectile. Thus, a rifled barrel will cause the non-lethal marking round 100 to spiral when shot, which will increase overall firing range and accuracy. On the other hand, the polygonal rifling barrel will cause the non-metal marking round 100 to spiral, and because the rifling is smooth, the non-metal marking round will maintain its speed and enable the non-lethal marking round 100 to capture the air dynamics behind non-lethal marking round 100. The benefit of the polygonal rifling barrel is that the non-lethal marking round will maintain its speed, and thus, while both types of barrels may be used, it is preferable to utilize a polygonal rifling barrel. Regardless of the barrel utilized, the resulting speed of the non-lethal marking round 100 must be less than 600 feet per second if the non-lethal marking round 100 is designed for Force on Force training or competition.

Figure 8:
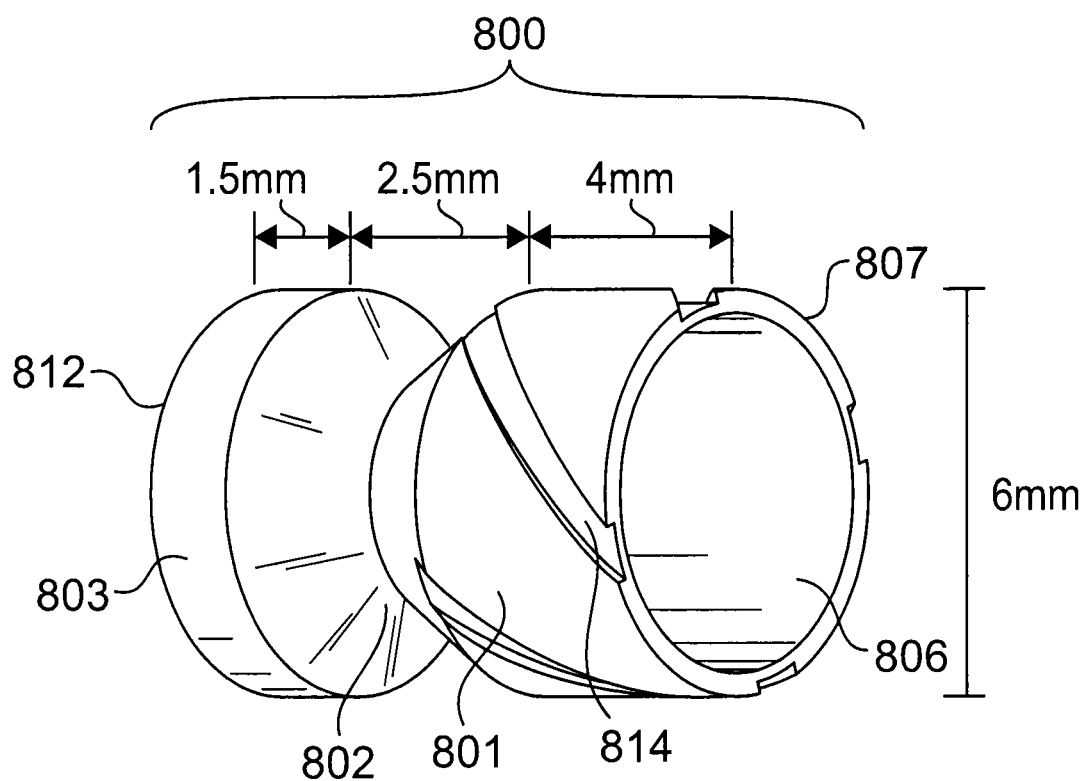
" and FIG. 8 is a front-perspective view of an example of another alternative embodiment of the present invention.

In an alternative embodiment, as reflected in FIG. 8, the non-lethal marking round pellet 800 is formed with one or more grooves 814. That non-lethal marking round pellet 800 with the one or more grooves 814 is to be used with a smooth bore barrel. Preferably, the size of the groove is dependent on the diameter and the length of the non-lethal marking round pellet 800, the length of the barrel, and based on the requirements of the non-lethal marking round pellet 800. For example, if the non-lethal marking round pellet 800 is being used for pistol training where the trainees will be in close distances, the length of the non-lethal marking round pellet 800 will preferably be shorter, and more in line with actual real firearm bullets. The size of the groove 814 and the number of the rifling twists will correlate to the size of the non-lethal marking round pellet 800 pellet and length of the barrel. Specifically, a lighter shorter bullet needs a slower rifling twist rate to give proper bullet spin for correct flight.

It is preferable that the grooves 814 in the non-lethal marking round pellet 800 imitate the effect of rifling within a barrel on the non-lethal marking round pellet 800; thus, the grooves 814 impart a spin to the non-lethal marking round pellet 800 which improves the aerodynamic stability and accuracy of the non-lethal marking round pellet 800.

As is further reflected in FIG. 8, it is preferred that the non-lethal marking round pellet 800 be a diameter of 5.75 mm up to 9 to 10 mm for use in the same sized air rifles and air pistols. In general, the diameter of the pellet needs to be sized to fit the particular shape and diameter of the air rifle or air pistol rifled or non-rifled barrel, and so, other diameters outside that range are possibilities as well. It is also preferred that the length of the non-lethal marking round pellet be 9 mm to 20 mm+ in length for use in specific types of pistols or rifles; however, other lengths outside that range are possible as well. In an exemplary embodiment, as show in FIG. 8, the non-lethal marking round pellet 100 has a diameter of 5 mm for use in a 5 mm air rifle or air pistol. Specifically, the distal end 807 of the head portion 801 and the distal end 812 of the tail portion 803 both have a diameter of 6 mm. The head cavity 806 may have an interior concave diameter which is larger than the diameter of the distal end 807 of the head portion 801 and the distal end 812 of the tail portion 803. The purpose of the larger diameter is for the easy insertion of a marking tip in the head cavity 806. For example, if the marking tip is 6 mm in diameter, the interior concave diameter of the head cavity 806 must be at least 6 mm. Additionally, as reflected in FIG. 8, the non-lethal marking round pellet 800 is 8 mm long. Specifically, the head portion 801 is 4 mm, the tail portion 803 is 1.5 mm, and the intermediary portion 802 is 2.5 mm. Preferably, both the diameter and length may be modified based on the size of the air rifle or air pistol.

The non-lethal marking round pellet 100 is expected to be heavier than a standard marking round, being generally between 0.20 grams and 0.75 grams, however, this may vary to greater or less weights depending on the size and materials used. A heavier non-lethal marking round allows for better stability in flight and allow the marking tip to have enough kinetic energy to break upon impact or mark with the appropriate substance (i.e chalk), and better ballistics training.

Figure 7:
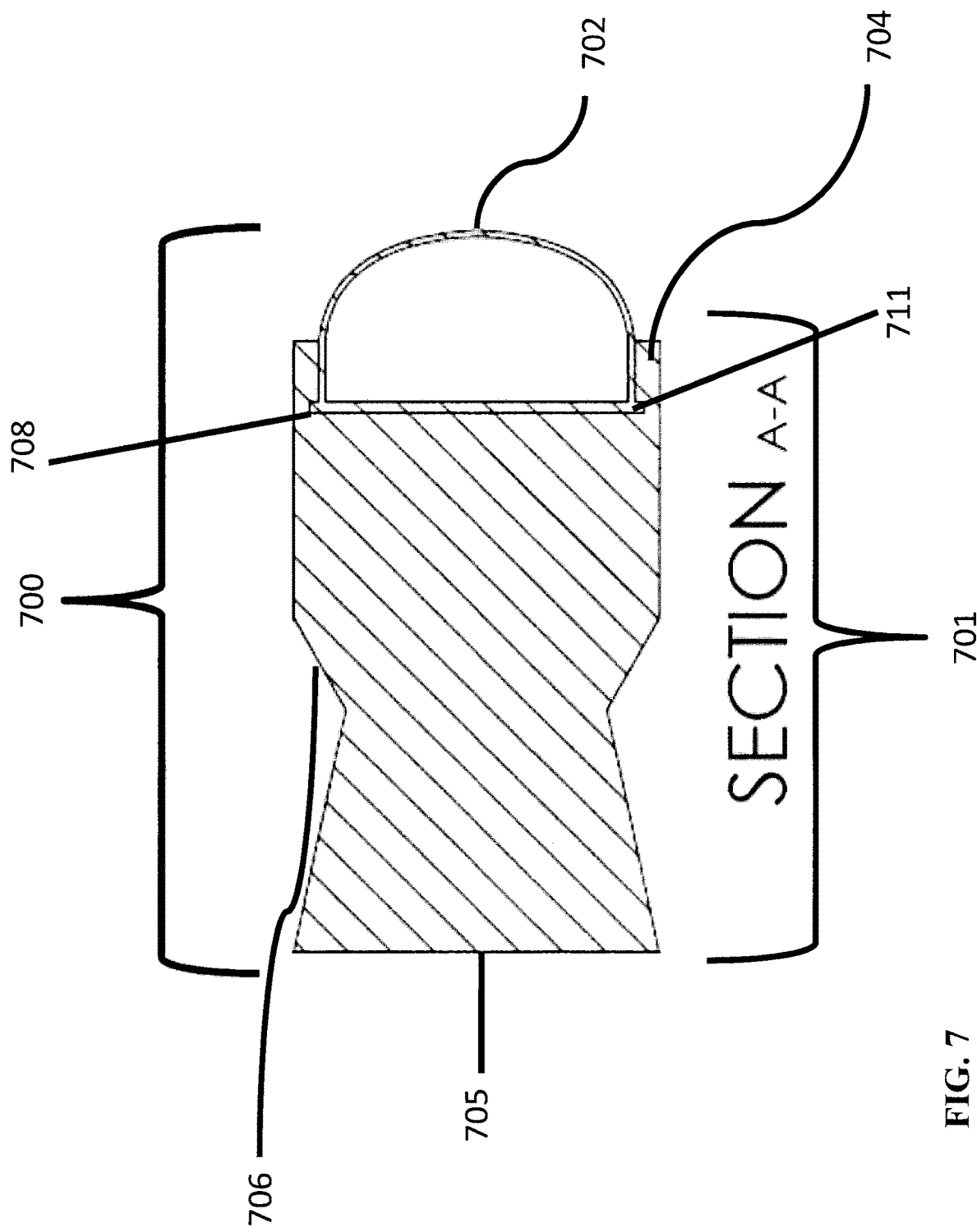
FIG. 7 is a section view of the present invention as described in its alternative embodiments, about section, "A-A.

As shown in FIG. 7, in an alternative embodiment of the present invention, the non-lethal marking round 700 comprises a marking tip 702 and casing 701. The marking tip 702 comprises an annular rim 711 and marking material. The casing 701 comprises a head portion 704, a tail portion 705, and an intermediary portion 706. The head portion 704 comprises a head cavity with a front section 701 and a groove 708, however, the rear section, which is preferably the concave section, may be omitted. Additionally, the tail cavity may be omitted from the tail portion 705 of this embodiment. As such, the non-lethal marking round pellet 700 and casing 701 comprise the same components and arrangements as described in the present invention's preferred embodiment, however, the tail cavity and/or head cavity's rear section will be omitted from the configuration.

A method of manufacturing a marking round pellet is also disclosed. In a preferred embodiment, the marking round pellet is manufactured by injection molding. In that embodiment, an injection mold is created so that it is configured to form a pellet that includes least a head portion, a tail portion, and an intermediary portion. The injection mold is preferably injected with a non-metal material such as the materials described herein. Preferably, the marking tip is immovably secured to the distal end of the head portion through injecting the non-metal material between the marking tip and the distal end of the head portion. Alternatively, an adhesive is utilized to immovably secure the distal end of the head portion to the marking tip.

Although the invention has been explained through the Figures in relation to its preferred embodiment, it is to be understood that many other possible modifications and variations can be made without departing from the spirit of the scope of the invention.

I claim:

1. A marking round pellet for use with air rifles or air pistols comprising:
    a casing, wherein the casing is a single, unitary piece of material which comprises at least a head portion, a tail portion, and an intermediary portion, wherein the intermediary portion is between the head portion and the tail portion and is tapered from the head portion toward the tail portion, and wherein the tail portion comprises at least a first side, a second side, a proximal end near the intermediary portion, a distal end, and a hollow tail cavity which is formed by tapering the first side from the distal end to the proximal end such that the tail cavity has a first inner diameter at the distal end and a second inner diameter toward the proximal end, the first inner diameter being greater than the second inner diameter, and the second side of the tail portion tapering from the distal end to the proximal end, such that the tail portion has a first outer diameter at the distal end and a second outer diameter at the proximal end with the first outer diameter being greater than the second outer diameter, wherein the head portion has a circular cross section with a uniform diameter that is approximately equal to the first outer diameter at the distal end of the tail portion, and
    a marking tip; and
    wherein the casing further comprises at least one groove.

2. The marking round pellet of claim 1, wherein the casing is a non-metal material.

3. The marking round pellet of claim 2, wherein the non-metal material is biodegradable.

4. The marking round pellet of claim 1, wherein the head portion comprises at least a front portion and a cavity.

5. The marking round pellet of claim 4, wherein the head portion further comprises a horizontal groove.

6. The marking round pellet of claim 5, wherein the groove is annular.

7. The marking round pellet of claim 1, wherein the head portion has a uniform diameter of about 5.75 mm up to about 10 mm.

8. The marking round pellet of claim 1, wherein the marking tip is immovably attached to the casing.

9. The marking round pellet of claim 1, wherein the marking tip comprises at least an annular rim and a marking material.

10. The marking round pellet of claim 9, wherein the marking material is chalk.

11. A marking round pellet for use with air rifles or air pistols comprising:
    a casing, wherein the casing is a single, unitary piece of material which comprises at least a head portion, a tail portion, and an intermediary portion, wherein the intermediary portion is between the head portion and the tail portion and is tapered from the head portion toward the tail portion, and wherein the tail portion comprises at least a first side, a second side, a proximal end near the intermediary portion, a distal end, and a hollow tail cavity which is formed by tapering the first side from the distal end to the proximal end such that the tail cavity has a first inner diameter at the distal end and a second inner diameter toward the proximal end, the first inner diameter being greater than the second inner diameter, and the second side of the tail portion tapering from the distal end to the proximal end, such that the tail portion has a first outer diameter at the distal end and a second outer diameter at the proximal end with the first outer diameter being greater than the second outer diameter, wherein the head portion has a circular cross section with a uniform diameter that is approximately equal to the first outer diameter at the distal end of the tail portion, and a marking tip; wherein the marking tip comprises at least an annular rim and a marking material.

12. The marking round pellet of claim 11, wherein the casing is a non-metal material.

13. The marking round pellet of claim 12, wherein the non-metal material is biodegradable.

14. The marking round pellet of claim 11, wherein the head portion comprises at least a front portion and a cavity.

15. The marking round pellet of claim 14, wherein the head portion further comprises a horizontal groove.

16. The marking round pellet of claim 15, wherein the groove is annular.

17. The marking round pellet of claim 11, wherein the head portion has a uniform diameter of about 5.75 mm up to about 10 mm.

18. The marking round pellet of claim 11, wherein the marking tip is immovably attached to the casing.

19. The marking round pellet of claim 11, wherein the casing further comprises at least one groove.

20. The marking round pellet of claim 11, wherein the marking material is chalk.

* * * * *